N. A. CLARK.
HOG-TROUGH.
No. 180,549.　　　　　　　　　　Patented Aug. 1, 1876.
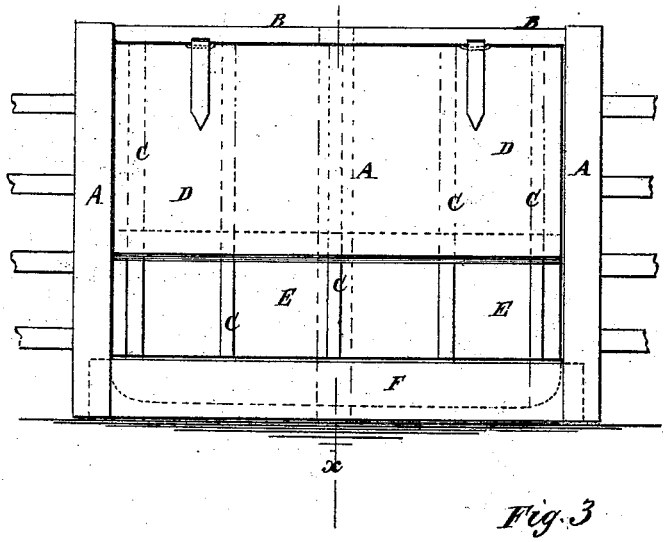
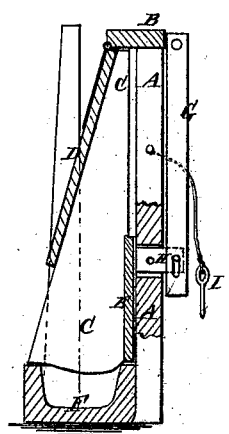
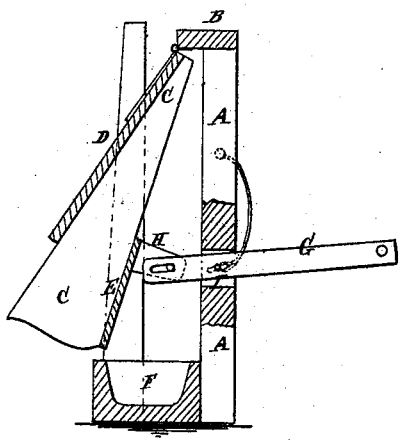
WITNESSES:
H. W. Almqvist
John Goethals
INVENTOR:
N. A. Clark
BY
Munn/C
ATTORNEYS.

UNITED STATES PATENT OFFICE.

NEWTON A. CLARK, OF HARVEYVILLE, KANSAS.

IMPROVEMENT IN HOG-TROUGHS.

Specification forming part of Letters Patent No. 180,549, dated August 1, 1876; application filed April 25, 1876.

*To all whom it may concern:*

Be it known that I, NEWTON AMBROSE CLARK, of Harveyville, in the county of Wabaunsee and State of Kansas, have invented a new and useful Improvement in Hog-Feeders, of which the following is a specification:

Figure 1 is a rear view of my improved device. Fig. 2 is a vertical cross-section of the same, taken through the line $x$ $x$, Fig. 1, showing it in position for the hogs to eat. Fig. 3 is the same section as Fig. 2, but showing the device arranged for putting in food.

Similar letters of reference indicate corresponding parts.

The object of this invention is to furnish an improved device for feeding hogs, which shall be so constructed as to keep the hogs away from the trough when putting in food, to prevent the hogs from putting their feet into the trough when feeding, and to be easily swept out.

The invention will first be described in connection with drawing, and then pointed out in the claim.

A are posts, which may be the posts of a fence or of a hog-pen, or posts set into the ground expressly for this purpose. To the upper ends of the posts A is attached a cross-bar, B, to which is hinged a door or gate, C D E. C are ribs or cross-pieces, placed at such a distance apart as to allow the hogs to put their heads between them.

The lower ends of the ribs C are made of a width equal to the width of the trough F, and they are beveled upon their forward edge from their lower to their upper ends. To the upper part of the beveled forward edges of the ribs C are attached boards D, the lower edges of which are at such a distance above the trough as to only leave room for the hogs to insert their heads beneath them.

To the lower part of the straight rear edges of the ribs C are attached boards E, the upper edges of which are a little higher than the lower edges of the boards D.

The middle post A has a slot or mortise formed in it, through which is passed a lever, G, the forward end of which has a short slot formed through it to receive the bolt by which it is pivoted to and between the lugs H, attached to the rear part of the hinged door or gate C D E. The lugs H are made of such a length as to pass through the post D far enough to allow the said lever G to be turned into an upright position and slipped down to lock the gate in place. The device may be made of any desired length, and the ends of the trough are inclined, so that refuse, water, &c., may be readily swept out.

To feed the hogs the lever G is drawn upward, is turned downward into a horizontal position, and is pushed forward to bring the lower edge of the boards E in line with the forward edge of the trough F, or nearly so, and is then secured in place by a pin, I, passed through holes in the post A and lever G. If desired, the lever G may be pushed forward to raise the door C D E, and allow the hogs to pass through.

The mode of operation is as follows: The lever G being raised into a perpendicular position, the boards E are thrown against the back of frame, so as to allow the hogs to have access to the trough F by passing between the ribs C. On the other hand, when the lever G is brought to a horizontal position, or nearly so, the boards E are thrown out in front of trough, so as to exclude the hogs therefrom.

The boards D, being hinged to the top piece B, serve to throw off the rain or snow, and also to support the dividing-ribs C.

What I claim as new is—

A hog-feeding device, consisting of frame A B, ribs C, hinged boards D, rib-boards E, and lever G, all connected, constructed, and arranged substantially as and for the purpose specified.

NEWTON AMBROSE CLARK.

Witnesses:
HARVY McCOSH,
HENRY R. WILCOX.